US010184458B2

(12) United States Patent
Al Tamsheh

(10) Patent No.: US 10,184,458 B2
(45) Date of Patent: *Jan. 22, 2019

(54) POWER GENERATION APPARATUS AND METHODS

(71) Applicant: Issa Saad Al Tamsheh, Damascus (SY)

(72) Inventor: Issa Saad Al Tamsheh, Damascus (SY)

(*) Notice: Subject to any disclaimer, the term of this patent is extended or adjusted under 35 U.S.C. 154(b) by 0 days.

This patent is subject to a terminal disclaimer.

(21) Appl. No.: 15/663,263

(22) Filed: Jul. 28, 2017

(65) Prior Publication Data

US 2017/0328355 A1    Nov. 16, 2017

Related U.S. Application Data

(63) Continuation of application No. 14/794,464, filed on Jul. 8, 2015, now Pat. No. 9,784,250.

(51) Int. Cl.
*F03G 7/08* (2006.01)
*F16H 31/00* (2006.01)
*F16H 37/12* (2006.01)

(52) U.S. Cl.
CPC .............. *F03G 7/08* (2013.01); *F16H 31/00* (2013.01); *F16H 31/003* (2013.01); *F16H 37/124* (2013.01); *Y02E 10/38* (2013.01)

(58) Field of Classification Search
CPC ........ F03G 7/08; F16H 31/003; F16H 37/124; F16H 31/00
USPC ................................................. 290/1 R, 1 C
See application file for complete search history.

(56) References Cited

U.S. PATENT DOCUMENTS

| 3,259,361 A * | 7/1966 | Cantu ................. F03B 13/1815 60/505 |
| 4,418,542 A * | 12/1983 | Ferrell ....................... F04B 9/00 417/229 |
| 4,452,045 A * | 6/1984 | Matlin .................. F04B 17/006 136/291 |
| 6,376,925 B1 * | 4/2002 | Galich ...................... F03G 7/08 290/1 R |

(Continued)

OTHER PUBLICATIONS

Form PCT/ISA/237 Written Opinion of the International Searching Authority from International Patent Application No. PCT/IB2016/001001, which claims priority to U.S. Appl. No. 14/794,464.

*Primary Examiner* — Viet Nguyen
(74) *Attorney, Agent, or Firm* — Michael W. Goltry; Robert A. Parsons; Parsons & Goltry

(57) ABSTRACT

A power generation apparatus includes a rocker arm having a first end and a second end and is mounted pivotally between the first end and the second end, wherein reciprocal movement of the first end between raised and lowered positions urges reciprocal movement of the second end between lowered and raised positions. A pulley apparatus couples the second end of the rocker arm to a drive member, wherein reciprocal movement of the second end of the rocker arm between its lowered and raised positions urges reciprocal rotation of the drive member between first and second positions. A transmission interacts between the drive member and the output shaft, wherein reciprocal rotation of the drive member between its first and second positions urges rotation of the output shaft in one direction.

10 Claims, 8 Drawing Sheets

(56) References Cited

U.S. PATENT DOCUMENTS

| | | | |
|---|---|---|---|
| 6,767,161 B1* | 7/2004 | Calvo | F03G 7/08 |
| | | | 290/1 R |
| 7,371,030 B2 | 5/2008 | Hickman | |
| 7,530,761 B2* | 5/2009 | Kenney | F01D 17/26 |
| | | | 404/17 |
| 7,714,456 B1 | 5/2010 | Daya | |
| 8,123,431 B2 | 2/2012 | Chen | |
| 8,461,700 B2 | 6/2013 | Kennedy | |
| 9,784,250 B2* | 10/2017 | Al Tamsheh | F03G 7/08 |
| 2005/0089370 A1 | 4/2005 | Painchaud | |
| 2007/0013244 A1* | 1/2007 | Kinkaid | H02K 7/1846 |
| | | | 310/75 C |
| 2007/0278800 A1* | 12/2007 | Galich | F03G 7/08 |
| | | | 290/1 R |
| 2009/0230684 A1* | 9/2009 | Gasendo | F03B 13/186 |
| | | | 290/53 |
| 2011/0049906 A1* | 3/2011 | Hughes | F03G 7/08 |
| | | | 290/1 C |
| 2011/0260472 A1 | 10/2011 | Barca | |
| 2014/0145451 A1* | 5/2014 | Burnaugh | H02K 53/00 |
| | | | 290/1 R |
| 2016/0111938 A1* | 4/2016 | Diaz | H02K 7/1853 |
| | | | 290/1 C |

* cited by examiner

POWER GENERATION APPARATUS AND METHODS

FIELD OF THE INVENTION

The present invention relates to a power generation apparatus and methods for generating power from moving objects.

BACKGROUND OF THE INVENTION

Skilled artisans have devoted considerable effort toward the development of systems designed to generate and transfer energy from the motion passing objects, such as vehicles. However, current efforts have not yielded entirely acceptable results. For instance, known such systems are expensive, inefficient, unreliable, difficult and expensive to manufacture, and notoriously impracticable. Given these ongoing and other shortcomings, the need for continued improvement in the art is evident.

SUMMARY OF THE INVENTION

According to the principle of the invention, a power generation apparatus includes a rocker arm having a first end and a second end and is mounted pivotally between the first end and the second end, wherein reciprocal movement of the first end between raised and lowered positions urges reciprocal movement of the second end between lowered and raised positions. A pulley apparatus couples the second end of the rocker arm to a drive member, wherein reciprocal movement of the second end of the rocker arm between its lowered and raised positions urges reciprocal rotation of the drive member between first and second positions. A transmission interacts between the drive member and the output shaft, wherein reciprocal rotation of the drive member between its first and second positions urges rotation of the output shaft in one direction. The drive member is spring-loaded to enable the drive member to return to the first position from the second position when the second end of the rocker arm moves from its raised position to its lowered position. The rocker arm is spring-loaded to enable the rocker arm to return to the raised position of the first end and the lowered position of the second end from the lowered position of the first end and the raised position of the second end. The pulley apparatus includes pulleys that support a drive element having an inner end connected to the second end of the rocker arm, and an outer end connected to the input. The drive element is a cable. The transmission is a gear assembly.

According to the principle of the invention, a power generation apparatus includes a rocker arm having a first end and a second end and is mounted pivotally between the first end and the second end, wherein reciprocal movement of the first end between raised and lowered positions urges reciprocal movement of the second end between lowered and raised positions. A drive gear is coupled to a drive member. The drive member engages the drive gear to cause one-way rotation thereof when the drive member rotates from a first position to a second position, and releases the drive gear when the drive member rotates from the second position to the first position. A pulley apparatus couples the second end of the rocker arm to the drive member, wherein reciprocal movement of the second end of the rocker arm between its lowered and raised positions urges reciprocal rotation of the drive member between its first and second positions. The drive member is spring-loaded to enable the drive member to return to the first position from the second position when the second end of the rocker arm moves from its raised position to its lowered position. The rocker arm is spring-loaded to enable the rocker arm to return to the raised position of the first end and the lowered position of the second end from the lowered position of the first end and the raised position of the second end. The pulley apparatus includes pulleys that support a drive element having an inner end connected to the second end of the rocker arm, and an outer end connected to the drive member. The drive element is a cable.

According to the principle of the invention, a power generation apparatus includes a rocker arm having a first end and a second end and is mounted pivotally between the first end and the second end, wherein reciprocal movement of the first end between raised and lowered positions urges reciprocal movement of the second end between lowered and raised positions. A driven gear is coupled to an output shaft. A drive gear is coupled to a drive member, and is coupled to the driven gear in meshing engagement. The drive member engages the drive gear to cause one-way rotation thereof when the drive member rotates from a first position to a second position and releases the drive gear when the drive member rotates from the second position to the first position, one-way rotation of the drive gear urges rotation of the driven gear, and rotation of the driven gear urges corresponding rotation of the output shaft in one direction. A pulley apparatus couples the second end of the rocker arm to the drive member, wherein reciprocal movement of the second end of the rocker arm between its lowered and raised positions urges reciprocal rotation of the drive member between its first and second positions. The drive member is spring-loaded to enable the drive member to return to the first position from the second position when the second end of the rocker arm moves from its raised position to its lowered position. The rocker arm is spring-loaded to enable the rocker arm to return to the raised position of the first end and the lowered position of the second end from the lowered position of the first end and the raised position of the second end. The pulley apparatus includes pulleys that support a drive element having an inner end connected to the second end of the rocker arm, and an outer end connected to the drive member. The drive element is a cable.

According to the principle of the invention, a power generation apparatus includes an output shaft, a shuttle mounted reciprocally to at least one rail, and power transfer assemblies. Each one of the power transfer assemblies includes a shuttle-actuated rocker arm, a pulley apparatus, and a transmission. The shuttle-actuated rocker arm includes a first end and a second end and is mounted for pivotal actuation between the first end and the second end, wherein reciprocal movement of the first end between raised and lowered positions urges reciprocal movement of the second end between lowered and raised positions. The pulley apparatus couples the second end of the shuttle-actuated rocker arm to a drive member, wherein reciprocal movement of the second end of the shuttle-actuated rocker arm between its lowered and raised positions urges reciprocal rotation of the drive member between first and second positions. The transmission interacts between the drive member and the output shaft, wherein reciprocal rotation of the drive member between its first and second positions urges rotation of the output shaft in one direction. Reciprocal movement of the shuttle urges sequential pivotal actuation of the rocker arms at the first ends. The drive member of each power transfer assembly is spring-loaded to enable the drive member to return to the first position from the second position when the second end of the shuttle-actuated rocker arm moves from its raised position to its lowered position. The shuttle-actuated rocker arm of each power transfer assembly is spring-loaded to enable the shuttle-actuated rocker arm to return to the raised position of the first end and the lowered position of the second end from the lowered position of the first end and the raised position of the second end. The pulley apparatus of each power transfer assembly includes pulleys that support a drive element having an inner end connected to the second end of the shuttle-actuated rocker arm, and an outer end connected to the drive member. The drive element of each power transfer assembly is a cable.

According to the principle of the invention, a power generation apparatus includes an output shaft, a shuttle mounted reciprocally to at least one rail, and power transfer assemblies. Each of the power transfer assemblies includes a shuttle-actuated rocker arm, a driven gear, an output shaft, a drive gear, and a pulley apparatus. The shuttle-actuated rocker arm includes a first end and a second end and is mounted for pivotal actuation between the first end and the second end, wherein reciprocal movement of the first end between raised and lowered positions urges reciprocal movement of the second end between lowered and raised positions. The driven gear is coupled to the output shaft. The drive gear is coupled to the drive member and is coupled to the driven gear in meshing engagement. The drive member engages the drive gear to cause one-way rotation thereof when the drive member rotates from a first position to a second position and releases the drive gear when the drive member rotates from the second position to the first position, one-way rotation of the drive gear urges rotation of the driven gear, and rotation of the driven gear urges corresponding rotation of the output shaft in one direction. The pulley apparatus couples the second end of the shuttle-actuated rocker arm to the drive member, wherein reciprocal movement of the second end of the shuttle-actuated rocker arm between its lowered and raised positions urges reciprocal rotation of the drive member between its first and second positions. Reciprocal movement of the shuttle urges sequential pivotal actuation of the shuttle-actuated rocker arms at the first ends. The drive member of each power transfer assembly is spring-loaded to enable the drive member to return to the first position from the second position when the second end of the shuttle-actuated rocker arm moves from its raised position to its lowered position. The shuttle-actuated rocker arm of each power transfer assembly is spring-loaded to enable the shuttle-actuated rocker arm to return to the raised position of the first end and the lowered position of the second end from the lowered position of the first end and the raised position of the second end. The pulley apparatus of each power transfer assembly includes pulleys that support a drive element having an inner end connected to the second end of the shuttle-actuated rocker arm, and an outer end connected to the drive member. The drive element of each power transfer assembly is a cable.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
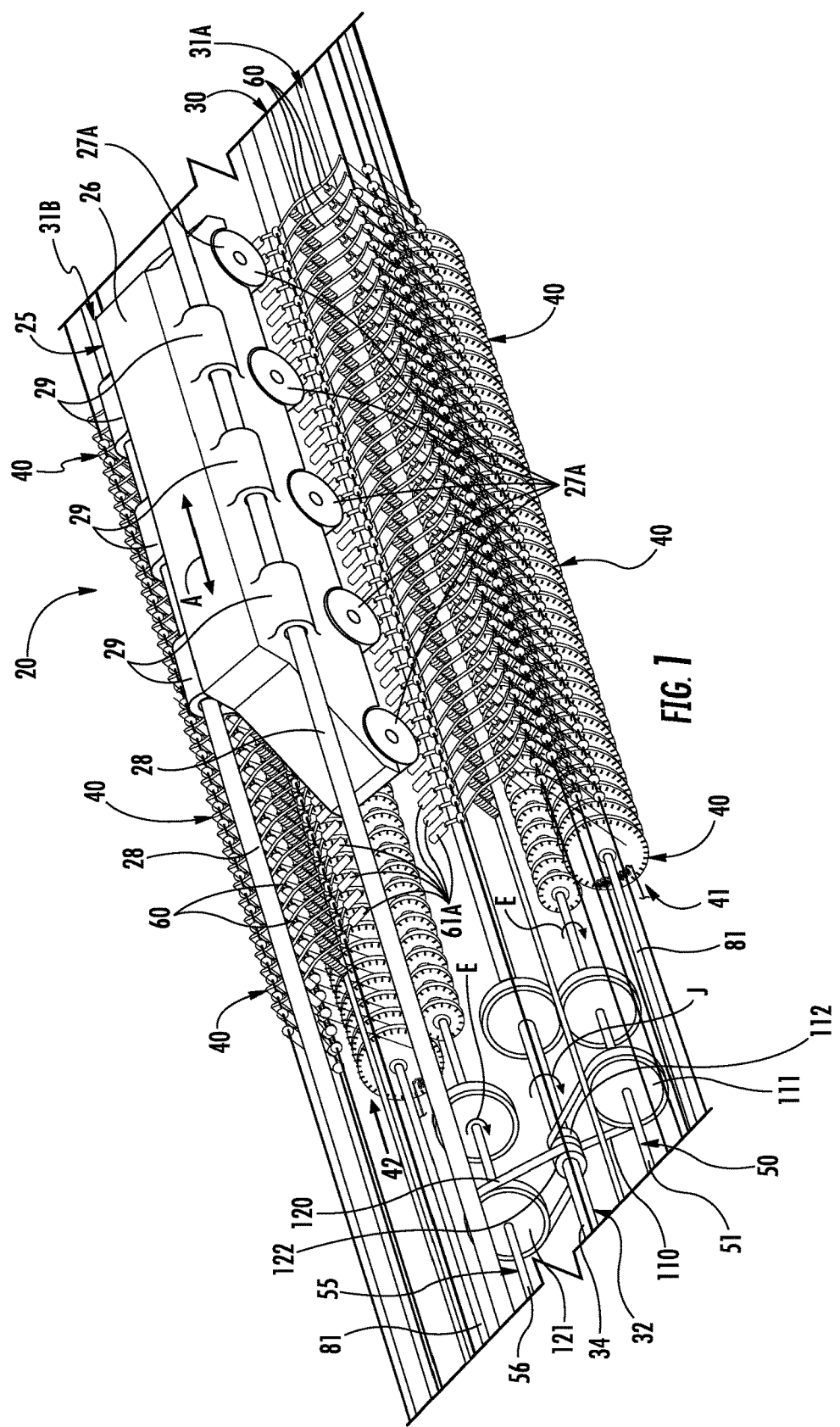
FIG. 1 is an isometric view of a power generation apparatus including a power generator and a shuttle mounted reciprocally, in accordance with the principle of the invention.

Turning now to the drawings, in which like reference characters indicate corresponding elements throughout the several views, attention is first directed to FIG. 1 illustrating a power generation apparatus 20 including a shuttle 25 mounted reciprocally and a power generator 30 operatively coupled to shuttle 25 for generating power when shuttle 25 moves reciprocally in the directions of double arrowed line A, in accordance with the principle of the invention. Power generator 30 actuates and generates power when shuttle 25 moves reciprocally in the directions indicated by double arrowed line A. The power generated by power generator 30 is applied to a main output 32 in this example. In this embodiment, main output 32 is a main output shaft 34 that is driven rotatably by power generator 30 when shuttle 25 moves reciprocally in the directions of double arrowed line A. The rotation of main output shaft 34 can be put to use for any beneficial purposes, such as for driving equipment, generating electricity, or other selected beneficial purpose.

Figure 2:
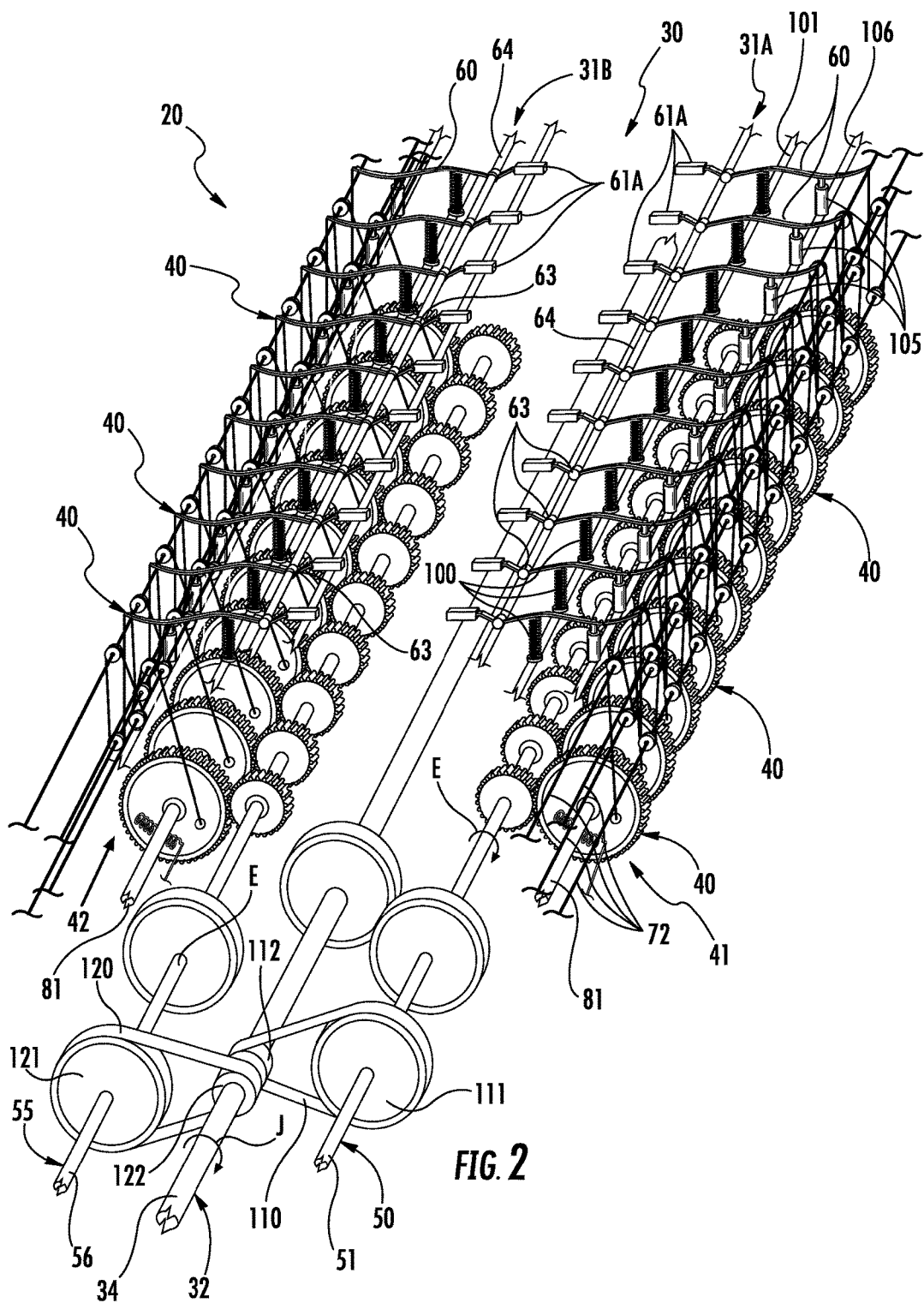
FIG. 2 is an enlarged, fragmentary view of the power generator of FIG. 1.

Referring to FIGS. 1 and 2, power generator 30 includes two subsystems 31A and 31B. Subsystems 31A and 31B are identical structurally and function identically. Subsystems 31A and 31B are spaced apart, oppose one another, and are parallel relative to one another. Subsystems 31A and 31B work independently of one another, and yet work in tandem in the operation of power generation apparatus 20 to generate power when shuttle 25 reciprocates in the directions of double arrowed line A.

Subsystem 31A actuates and generates power when shuttle 25 moves reciprocally in the directions indicated by double arrowed line A. Subsystem 31A is operatively coupled to main output shaft 34, whereby actuation of subsystem 31A in response to reciprocal movement of shuttle 25 in the directions of double arrowed line A urges rotation of main output shaft 34. Identically to subsystem 31A, subsystem 31B actuates and generates power when shuttle 25 moves reciprocally in the directions indicated by double arrowed line A. Subsystem 31B is operatively coupled to main output shaft 34, whereby actuation of subsystem 31B in response to reciprocal movement of shuttle 25 urges rotation of main output shaft 34. According to the invention, subsystems 31A and 31B actuate and work in concert in power generation apparatus 20, whereby concurrent actuation of subsystems 31A and 31B in response to reciprocal movement of shuttle 25 urges rotation of main output shaft 34.

Subsystem 31A includes power transfer assemblies 40 that are spaced-apart and axially aligned in a first row 41. Subsystem 31B includes power transfer assemblies 40 that are spaced apart and axially aligned in a second row 42. Power transfer assemblies 40 of first row 41 work independently from one another and from power transfer assemblies 40 of second row 42, and power transfer assemblies 40 of second row 42 work independently from one another and from power assemblies 40 of first row 41. Power transfer assemblies 40 in first and second rows 41 and 42 actuate between at-rest and actuated positions to generate power when shuttle 25 moves reciprocally in the directions indicated by double arrowed line A. Rows 41 and 42 oppose one another and are spaced-apart and parallel in relation to each other, and include an equal number of power transfer assemblies 40. In this example there are a total of seventy power transfer assemblies 40, thirty-five power transfer assemblies 40 in row 41, and thirty-five power transfer assemblies 40 in row 42. Power transfer assemblies 40 of rows 41 and 42 are operatively connected to main output shaft 34. Reciprocal movement of shuttle 25 in the directions of double arrowed line A sequentially and repeated actuates power transfer assemblies 40 of rows 41 and 42, and the sequential and repeated actuation of power transfer assemblies urges rotation of main output shaft 34 in one direction.

Power transfer assemblies 40 of row 41 are coupled concurrently an output 50, and power transfer assemblies 40 of row 42 are concurrently connected to output 55. Output 50 is part of subsystem 31A, and output 55 is part of subsystem 31B. Output 50 is an output shaft 51, and output 55 is an output shaft 56. Output shafts 51 and 56 are each mounted rotatably to fixtures or retaining structures on either side of power generator 30 in an illustrative embodiment. Output shafts 51 and 56 are located on either side of main output shaft 34, and are spaced-apart and parallel in relation to main output shaft 34. Actuation of power transfer assemblies 40 of row 41 between at-rest and actuated positions in response to reciprocal movement of shuttle 25 in the directions of double arrowed line A in FIG. 1 urges corresponding rotation of output shaft 51 in one direction. Output shaft 51 is coupled to main output shaft 34, whereby rotation of output shaft 51 urges corresponding rotation of main output shaft 34 in one direction. Actuation of power transfer assemblies 40 of row 42 between at-rest and actuated positions in response to reciprocal movement of shuttle 25 in the directions of double arrowed line A in FIG. 1 urges corresponding rotation of output shaft 56 in one direction, which is the same direction of rotation of output shaft 51. Output shaft 56 is coupled to main output shaft 34, whereby rotation of output shaft 56 urges corresponding rotation of main output shaft 34 in one direction, which is the same direction of rotation of main output shaft 34 produced from rotation of output shaft 51. Output shaft 51, output shaft 56, and main output shaft 34 rotate in the same direction in the operation of power generation apparatus 20, which in this example is a clockwise direction of rotation in FIGS. 1 and 2. The clockwise direction of rotation of output shaft 51 is indicated by an arrowed line E, the clockwise direction of rotation of output shaft 56 is also indicated by an arrowed line E, and the clockwise direction of main output shaft 34 is indicated by arrowed line J. Accordingly, output shafts 51 and 56 are concurrently coupled to main output shaft 34, whereby the concurrent rotation of output shafts 51 and 56 in the same direction in response to reciprocal movement of shuttle 25 in the directions of double arrowed line A urges corresponding rotation to main output shaft 34 in the same rotational direction as that of output shaft 51 of subsystem 31A and output shaft 56 of subsystem 31B.

Subsystems 31A and 31B are identical structurally and functionally. Accordingly, the further details of subsystem 31A will now be discussed in detail, with the understanding that the ensuing discussion of subsystem 31A applies in every respect to subsystem 31B.

Figure 3:
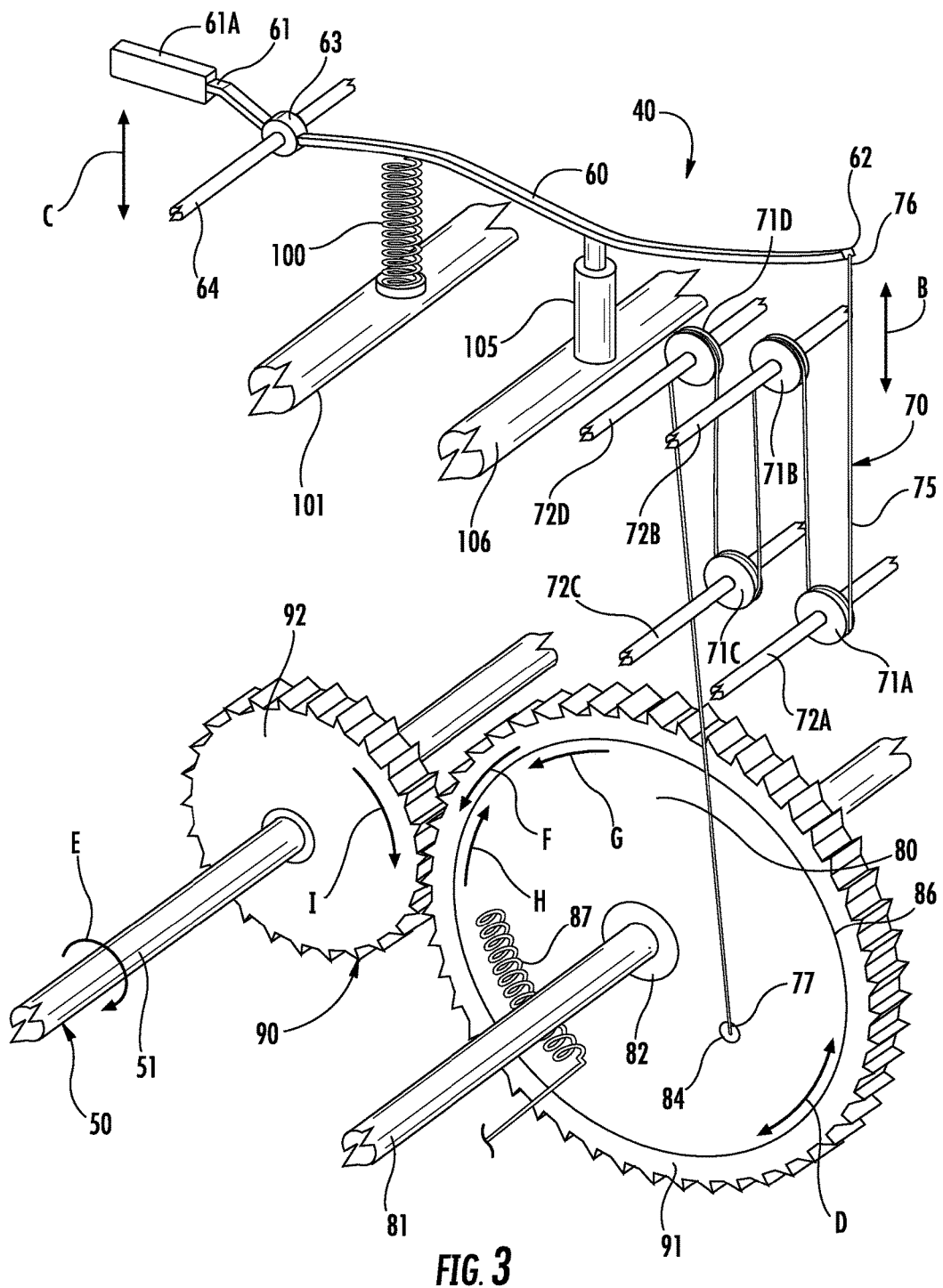
FIG. 3 is an enlarged, fragmentary view corresponding to FIG. 2 showing a power transfer assembly of the power generator in greater detail and as it would appear at rest.
Figure 4:
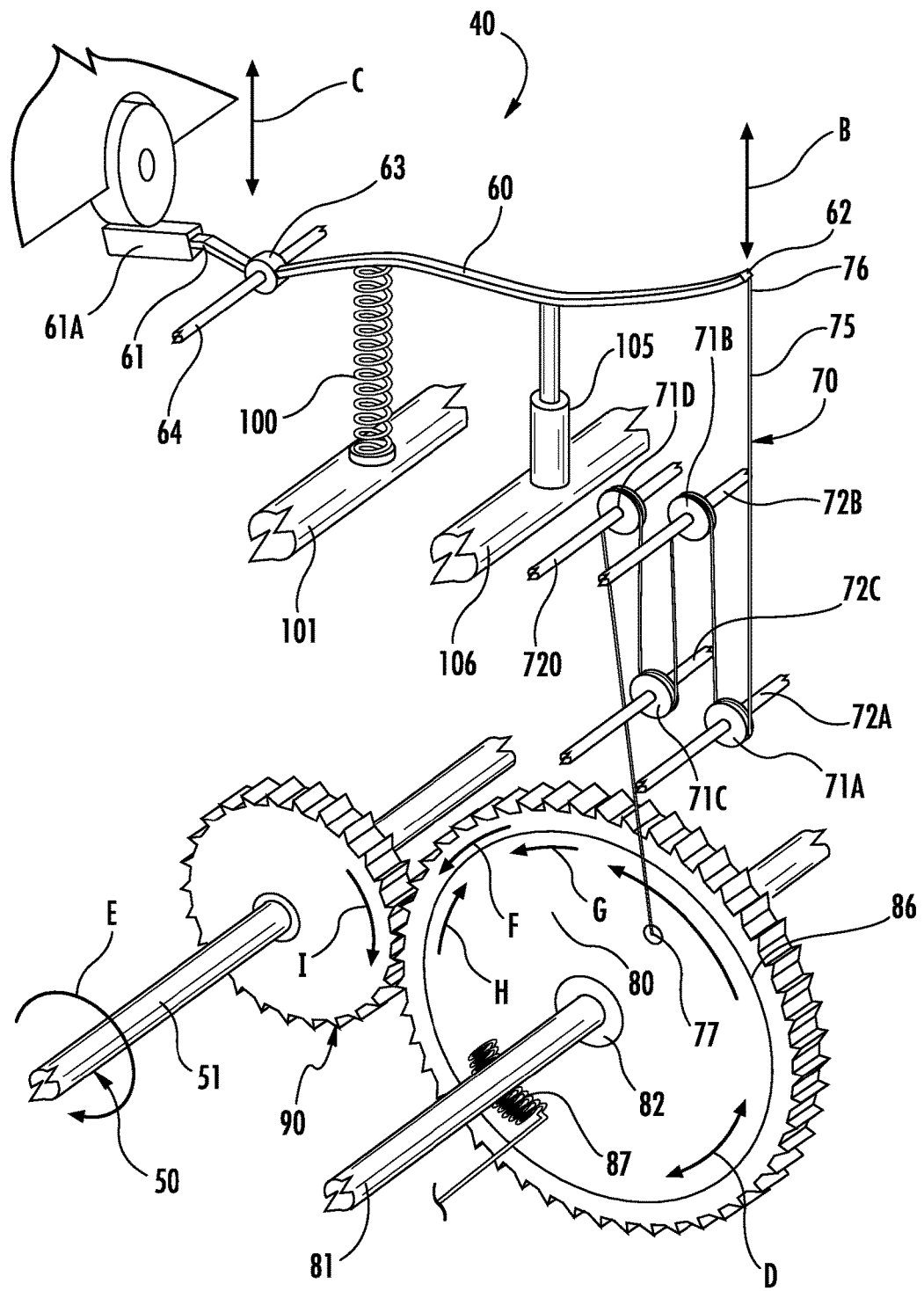
FIG. 4 is a view similar to that of FIG. 3 showing the power transfer assembly as it would appear actuated.
Figure 7:
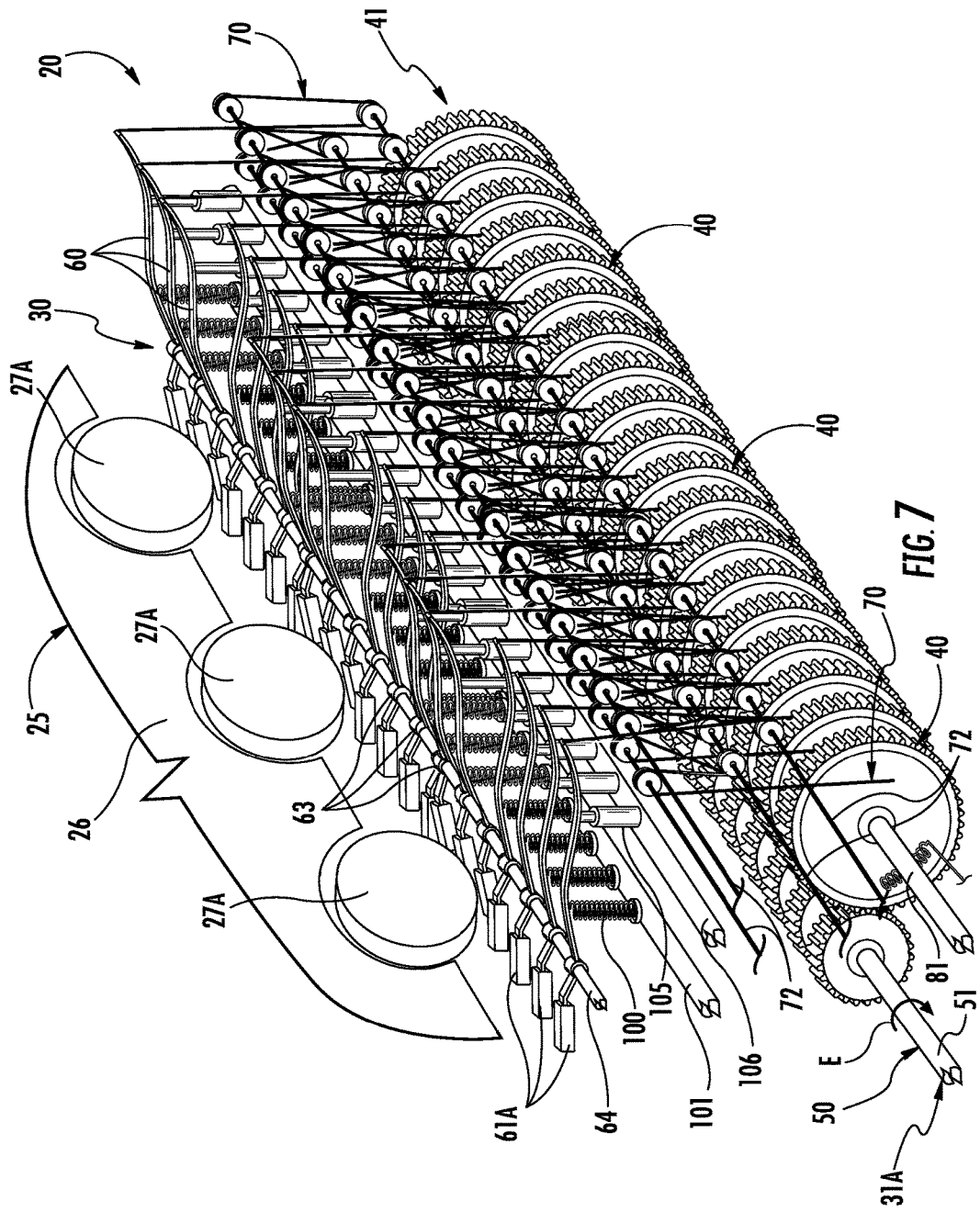
FIG. 7 is an enlarged, fragmentary, isometric view corresponding to FIG. 1 showing the shuttle interacting with the power generator.

In FIGS. 3 and 4, power transfer assembly 40 of subsystem 31A includes a rocker arm 60, a pulley apparatus 70, a drive member 80, and a transmission 90 operatively coupled between drive member 80 and output shaft 51. Rocker arm 60 is elongate and is fashioned of steel, aluminum, or other durable material or combination of durable materials. Rocker arm 60 has a first or proximal end 61, a second or distal end 62, and is mounted pivotally between first end 61 and second end 62 at pivot 63 for pivotal movement between a first or at-rest position in FIG. 3 in the at-rest position of power transfer assembly 40 and a second or actuated position in FIG. 4 in the actuated position of power transfer assembly 40. Pivot 63 is mounted pivotally to elongate shaft 64. Rocker arm 60 pivots at pivot 63, like a seesaw, between its at-rest position in FIG. 3 that defines the at-rest position of power transfer assembly 40, and its actuated position in FIG. 4 that defines the actuated position of power transfer assembly 40. Second end 62 moves reciprocally between lowered and raised positions in directions of double arrowed line B when first end 61 oppositely moves reciprocally between raised and lowered positions in the directions of double arrowed line C in the pivotal movement of rocker arm 60 between its at-rest position in FIG. 3 in the at-rest position of power transfer assembly 40 and its actuated position in FIG. 4 in the actuated position of power transfer assembly 40. First end 61 carries a pedal 61A that is worked up-and-down by shuttle 25 when shuttle 25 moves reciprocally in the directions of arrowed line A in FIG. 1. Pedal 61A is part of first end 61. The length of rocker arm 60 from pivot 63 to second end 62 is longer than the length of rocker arm 60 from first end 61 to pivot 63. Elongate shaft 64 is fixed in place, and is secured to fixtures or retaining structures on either side of power generator 30 in an illustrative embodiment. In FIGS. 2 and 7, pivots 63 of power transfer assemblies 40 of row 41 of subsystem 31A are concurrently pivotally mounted to elongate shaft 64.

Pulley apparatus 70 couples second end 62 of rocker arm 60 to drive member 80, wherein reciprocal movement of second end 62 of rocker arm 60 between its lowered and raised positions in the directions of double arrowed line B in the pivotal movement of rocker arm 60 between its at-rest position in FIG. 3 and its actuated position in FIG. 4 urges reciprocal rotation of drive member 80 in opposite rotational directions indicated by double arrowed line D between a first or at-rest position in FIG. 3 and a second or actuated position in FIG. 4. In this example, arrowed line G indicates a counterclockwise direction of rotation of drive member 80 from its first position thereof in FIG. 3 to its second position thereof in FIG. 4 in response to movement of second end 62 of rocker arm 60 from its lowered position in FIG. 3 to its raised position in FIG. 4 that occurs when rocker arm 60 pivots along a drive stroke from its at-rest position in FIG. 3 to its actuated position in FIG. 4. Arrowed line H indicates a clockwise direction of rotation of drive member 80 from its second position in FIG. 4 to its first position in FIG. 3 in response to movement of second end 62 of rocker arm 60 from its raised position in FIG. 4 to its lowered position in FIG. 3 that occurs when rocker arm 60 pivots along a reset stroke from its actuated position in FIG. 4 to its at-rest position in FIG. 3. The counterclockwise direction of rotation of drive member 80 from its first position thereof in FIG. 3 to its second position thereof in FIG. 4 is a drive stroke of drive member 80, and pivotal movement of rocker arm 60 from its at-rest position in FIG. 3, corresponding to the lowered position of second end 62 and the raised position of first end 61, to its actuated position in FIG. 4, corresponding to the raised position of second end 62 and the lowered position of first end 61, is the drive stroke of rocker arm 60. The clockwise direction of rotation of drive member 80 from its second position thereof in FIG. 4 to its first position thereof in FIG. 3 is a reset stroke of drive member 80, and pivotal movement of rocker arm 60 from its actuated position in FIG. 4, corresponding to the raised position of second end 62 and the lowered position of first end 61, to its at-rest position in FIG. 3, corresponding to the lowered position of second end 62 and the raised position of first end 61, is the reset stroke of rocker 60 arm.

Transmission 90 interacts between drive member 80 and output shaft 51, wherein reciprocal rotation of drive member 80 in the directions of double arrowed line D between its first or at-rest position in FIG. 3 and its second or actuated position in FIG. 4, the drive stroke of drive member 80, in response to pivoting of rocker arm 60 from its at-rest position in FIG. 3 to its actuated position in FIG. 4, the drive stroke of rocker arm 60, urges rotation of output shaft 51 in the direction of arrowed line E, a clockwise direction of rotation in FIGS. 3 and 4. In FIGS. 2 and 7, transmissions 90 of power transfer assemblies 40 of row 41 independently interact between output shaft 51 and the respective drive members 80, wherein reciprocal rotation of each drive member 80 in the directions of double arrowed line D in FIGS. 3 and 4 between the first or at-rest position thereof in FIG. 3 and the second or actuated position thereof in FIG. 4 urges rotation of output shaft 51 in the direction of arrowed line E.

Drive member 80, a circular, disk-shaped body formed of steel, aluminum, or other durable material or combination of durable materials, is mounted rotatably to elongate shaft 81 with a central bearing 82. In FIGS. 2 and 7, drive members 80 of power transfer assemblies 40 of row 41 are concurrently mounted rotatably to elongate shaft 81. Elongate shaft 81 is fixed in place, and is secured to fixtures or retaining structures on either side of power generator 30 in an illustrative embodiment. Pulley apparatus 70 couples second end 62 of rocker arm 60 to drive member 80, wherein drive member 80 reciprocates rotatably in the directions of double arrowed line D between the first position thereof in FIG. 3 and the second position thereof in FIG. 4 when second end 62 of rocker arm 60 moves reciprocally between its lowered position in FIG. 3 corresponding to the raised position of first end 61, and its raised position in FIG. 4 corresponding to the lowered position of first end 61 in FIG. 4, in the pivotal movement of rocker arm 60 between its at-rest position in FIG. 3 and its actuated position in FIG. 4.

Pulley apparatus 70 includes pulleys 71 that support a drive element 75. Drive element 75 is a cable in the present embodiment, and can be a belt or the like in an alternate embodiment. Drive element 75 has an inner or upper end 76 connected, such as by welding or one or more rivets, clamps, or the like, to second end 62 of rocker arm 60, and outer or lower end 77 connected, such as by welding, one or more rivets or other fastener type, to a pin 84 mounted rotatably to drive member 80 at an intermediate location between bearing 82 and outer diameter 86 of drive member 80. Pulleys 71 are mounted rotatably to corresponding elongate shafts 72. Elongate shafts 72 are fixed in place, and are secured to fixtures or retaining structures on either side of power generator 30 in an illustrative embodiment. In FIGS. 2 and 7, pulleys 71 of power transfer assemblies 40 of row 41 are concurrently rotated to elongate shafts 72.

Pulleys 71 entrain drive element 75 between inner end 76 and outer end 77. There are four pulleys 71 in this example, which are staggered from right to left in FIGS. 3 and 4 and include lower pulley 71A, upper pulley 71B, lower pulley 71C, and upper pulley 71D. Lower pulley 71A is carried by elongate shaft 72A, upper pulley 71B is carried by elongate shaft 72B, lower pulley 71C is carried by elongate shaft 72C, and upper pulley 71D is carried by elongate shaft 72D. Upper pulleys 71B and 71D are positioned side-by side and are parallel relative to lower pulleys 71A and 71C that are positioned side-by-side. The rotational axes of pulleys 71 coincide with the respective shafts 72, and are parallel to each other and to the rotational axes of drive member 80, output shaft 51, and main output shaft 34 in FIGS. 1 and 2. Drive element 75 extends downwardly from second end 62 of rocker arm 62, is entrained in sequence by pulleys 71, and extends downwardly from upper pulley 71D to drive member 80. Drive element 75 is entrained by pulleys 71 in an up-and-down pattern, downwardly from second end 62 of rocker arm 60 to lower pulley 71A, upwardly from lower pulley 71A to upper pulley 71B, downwardly from upper pulley 71B to lower pulley 71C, upwardly from lower pulley 71C to upper pulley 71D, and then downwardly from upper pulley 71D to drive member 80. This pulley apparatus 70 imparts a mechanical advantage to the force applied to first end 61 of rocker arm 60 at pedal 61A, whereby the force applied to outer end 77 of drive element 75 to rotate drive member 80 from its first position in FIG. 3 to its second position in FIG. 4 is less than the force required to be applied to pedal 61A of first end 61 of rocker arm 60 to pivot rocker arm 60 from its at-rest position in FIG. 3 to its actuated position in FIG. 4, and the rotational distance traveled by outer end 77 of drive element 75 between its first position in FIG. 3 and its second position in FIG. 4 is greater than the distance traveled by pedal 61A of first end 61 of rocker arm 60 between its raised position in FIG. 3 and its lowered position in FIG. 4 in the movement of rocker arm 60 from its at-rest position in FIG. 3 to its actuated position in FIG. 4.

As explained above, transmission 90 interacts between drive member 80 and output shaft 51, wherein reciprocal rotation of drive member 80 in the directions of double arrowed line D between its first position in FIG. 3 and its second position in FIG. 4 urges rotation of output shaft in the direction of arrowed line E. Transmission 90 includes a drive gear 91 and a driven gear 92.

Drive gear 91 is coupled to drive member 80. Drive gear 91 is a ring gear formed of steel, aluminum, or other durable material or combination of durable materials. Drive gear 91 is mounted rotatably to outer diameter 86 of drive member 80. Drive member 80 engages drive gear 91 to cause one-way rotation thereof in the direction of arrowed line F, a counterclockwise direction of rotation, when drive member 80 rotates along its drive stroke in the direction of arrowed line G, the same direction as arrowed line F, from its first position or at-rest position in FIG. 3 to its second or actuated position in FIG. 4, and releases drive gear 91, which can freely rotate in the direction of arrowed line F, when drive member 80 rotates along its reset stroke from its second or actuated position in FIG. 4 to its first or at-rest position in FIG. 3 in the opposite direction of arrowed line H. The free rotation of drive gear 91 in the direction of arrowed line F decouples drive member 80 from drive gear 91 so as to permit the corresponding free rotation of drive gear 91 in the same direction in the direction of arrowed line F. The combination of drive gear 91 and drive member 80 is conventional clutch-gear assembly, further details of which are well known to the skilled person and will not be discussed. Driven gear 92 is coupled to output shaft 51. Driven gear 80 is a pinion, and is fashioned of steel, aluminum, or other durable material or combination of durable materials. In FIGS. 2 and 7, driven gears 92 of power transfer assemblies 40 of row 41 are concurrently coupled to output shaft 52.

Drive gear 91 is coupled to driven gear 92 in meshing engagement. As explained above, drive member 80 engages drive gear 91 to cause one-way rotation thereof in the direction of arrowed line F when drive member 80 rotates along its drive stroke in the direction of arrowed line G, the same direction as arrowed line F, from its first or at-rest position in FIG. 3 to its second or actuated position in FIG. 4 when rocker arm 60 move along its drive stroke from its at-rest position in FIG. 3 to its actuated position in FIG. 4, and releases drive gear 91 when drive member 80 rotates along its rest stroke from the second position in FIG. 4 to the first position in FIG. 3 in the opposite direction of arrowed line H when rocker arm 60 moves along its reset stroke from its actuated position in FIG. 4 to its at-rest position in FIG. 3. One-way rotation of drive gear 91 in the direction of arrowed line F driven by rotation of drive member 80 in the direction of arrowed line G from its first position in FIG. 3 to its second position in FIG. 4 urges rotation of driven gear 92 in the opposite clockwise direction of arrowed line I, and rotation of driven gear 92 in the direction of arrowed line I urges corresponding rotation of output shaft 51 in the same clockwise direction indicated by arrowed line E. The free rotation of drive gear 91 in the direction of arrowed line F when drive member rotates along its reset stroke from its actuated position in FIG. 4 to its at-rest position in FIG. 3 decouples drive member 80 from output shaft 51 and permit the corresponding free rotation of output shaft 51 and drive gear 92 in the opposite direction indicated by arrowed line E and also main output shaft 34 in the same direction of arrowed line J in FIGS. 1 and 2.

Drive member 80 is spring-loaded with spring 87 coupled to drive member 80 to enable drive member 80 return to its first or at-rest position in FIG. 3 from its second or actuated position in FIG. 4 when second end 62 of rocker arm 60 moves from its raised position in the actuated position of rocker 60 in FIG. 4 to its lowered position in the at-rest position of rocker arm 60 in FIG. 3. Spring 87, a compression spring in this example that is outwardly biased, constantly urges drive member 80 toward its first or at-rest position in FIG. 3. Spring 87 is under constant outward tension and is extended in the first or at-rest position of drive member 80 in FIG. 3, and is compressed in the second or actuated position of drive member 80 in FIG. 4. Drive member 80 moves from its first position in FIG. 3 to its second position in FIG. 4 in the direction of arrowed line G in response to application of a force on drive member 80 from pulley assembly 70 via pivotal actuation of rocker arm 60 from its at-rest position in FIG. 3 to its actuated position in FIG. 4 that is sufficient to overcome spring 87. Spring 87 constantly acts on drive member 80 urging it and rotationally resetting it from its second position in FIG. 4 to its first position in FIG. 3 in the direction of arrowed line H in response to movement of rocker arm 60 from its actuated position in FIG. 4 to its at-rest position in FIG. 3.

Rocker arm 60 is also spring-loaded, in this example with a spring 100, and with a piston-cylinder assembly 105, to enable rocker arm 60 to return to its at-rest position in FIG. 3, the raised position of the first end 61 and the lowered position of second end 62, from its actuated position in FIG. 4, the lowered position of first end 61 and the raised position of second end 62 in FIG. 4. Spring 100 is coupled between elongate shaft 101 and rocker arm 60 between pivot 63 and second end 62 of rocker arm 60, and piston-cylinder assembly 105 is coupled between elongate shaft 106 and rocker arm 60 between spring 100 and second end 62 of rocker arm 60. Elongate shaft 101 is fixed in place, and is secured to fixtures or retaining structures on either side of power generator 30 in an illustrative embodiment. Elongate shaft 106 is similarly fixed in place, and is secured to fixtures or retaining structures on either side of power generator 30 in an illustrative embodiment. In FIGS. 2 and 7, springs 100 of power transfer assemblies 40 of row 41 are concurrently mounted to elongate shaft 101. In FIGS. 2 and 7, piston-cylinder assemblies 105 of power transfer assemblies 40 of row 41 are concurrently mounted to elongate shaft 106.

Spring 100, a compression spring in this example that is inwardly biased, constantly acts on rocker arm 60 constantly urging rocker arm 60 to its at-rest position in FIG. 3 away from its actuated position in FIG. 4. Spring 100 is contracted in the at-rest position of rocker arm 60 in FIG. 3, is extended in the actuated position of rocker arm 60 in FIG. 4, and constantly pulls rocker arm 60 toward it's at-rest position in FIG. 3. Although the bias supplied by spring 100 is a pulling force, spring 100 can be rearranged to accomplish its function via pushing force against rocker arm 61.

Piston-cylinder assembly 150, a pneumatic or hydraulic piston-cylinder assembly that is inwardly biased, constantly acts on rocker arm 60 constantly urging rocker arm 60 toward its at-rest position in FIG. 3 away from its actuated position in FIG. 4. Piston-cylinder assembly 105 is contracted in the at-rest position of rocker arm 60 in FIG. 3, is extended in the actuated position of rocker arm 60 in FIG. 4, and constantly pulls rocker arm 60 to toward it's at-rest position in FIG. 3. In the at-rest position of rocker arm 60 in FIG. 4, piston-cylinder assembly 105 is bottomed out, limiting movement of rocker arm 60 past its at-rest position away from its actuated position. Although the bias supplied by piston-cylinder assembly 150 is a pulling force, piston-cylinder assembly 150 can be rearranged to accomplish its function via pushing force against rocker arm 61, and can be further rearranged to bottom out in its extended position to limit movement of rocker arm 61 beyond its at-rest position.

In FIGS. 1 and 2, output shafts 51 and 56 are operatively coupled to main output shaft 34 with pulley apparatus 70, whereby clockwise rotation of output shafts 51 and 56 indicated by arrowed lines E urges corresponding clockwise rotation of main output shaft 34 indicated by arrowed line J. In this example, the pulley apparatus of subsystem 31A includes a continuous drive belt 110 entrained by a drive pulley 111 mounted to output shaft 51 and a driven pulley 112 mounted to main output shaft 34, and the pulley apparatus of subsystem 31B includes a continuous drive belt 120 entrained by a drive pulley 121 mounted to output shaft 56 and a driven pulley 122 mounted to main output shaft 34.

Referring back to FIGS. 1 and 2, rows 41 and 42 of power transfer assemblies 40 oppose one another and are spaced-apart and parallel in relation to each other, and, again, include an equal number of power transfer assemblies 40, including thirty-five power transfer assemblies 40 in row 41 of subsystem 31A, and thirty-five power transfer assemblies 40 in row 42 of subsystem 31B. Pedals 61A of power transfer assemblies 40 of row 41 are spaced-apart and axially aligned with pedals 61A of power transfer assemblies 40 of row 42. Pedals 61A of power transfer assemblies 40 of rows 41 and 42 are operatively coupled to shuttle 25, whereby reciprocal movement of shuttle 25 in the directions of double arrowed line A sequentially and repeated actuates power transfer assemblies 40 of rows 41 and 42 at pedals 61A by sequentially and repeatedly pivoting each rocker arm 60 between its at-rest position, as in FIG. 3, and its actuated position, as in FIG. 4, which urges rotation of output shafts 51 and 56 each in the direction of arrowed line E which, in turn, urges corresponding rotation of main output shaft 34 in the direction of arrowed line J.

Figure 5:
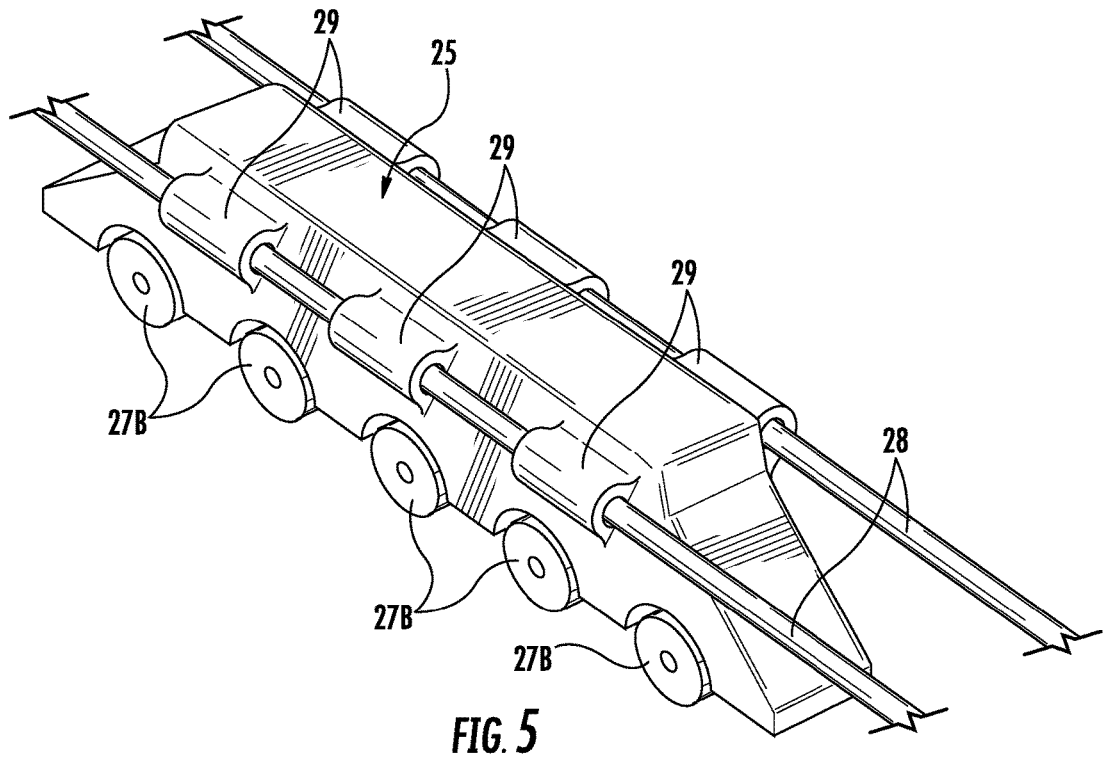
FIG. 5 is an enlarged, isometric view of the shuttle of FIG. 1.

Power transfer assemblies 40 in first and second rows 41 and 42 repeatedly and sequentially actuate and generate power when shuttle 25 moves reciprocally in the directions indicated by double arrowed line A. In FIGS. 1 and 5, shuttle 25 a motor-driven, ten-wheeled, all-wheel drive vehicle including a vehicle body 26 having five-equally spaced-apart wheels 27A on one side thereof, and five-equally spaced-apart wheels 27B on the opposite side thereof. Wheels 27A on one side of vehicle body 26 are axially aligned with the respective wheels 27B on the opposite side of vehicle body 26. Shuttle 25 is mounted reciprocally to rails 28. Rails 28 are spaced-apart and parallel relative to each other and to output shafts 51 and 56 and main output shaft 34 in FIG. 1. Rails 28 are fixed in place centrally above subsystems 31A and 31B, and are secured to fixtures or retaining structures on either side of power generator 30 in an illustrative embodiment. Rails 28 extend through collars 29 on either sides of vehicle body 26. In the actuation of shuttle 25, wheels 27 are motor-driven concurrently in reciprocal clockwise and counterclockwise directions, such as by an onboard electric or internal combustion engine coupled to wheels 27 with a conventional onboard drivetrain.

Figure 6:
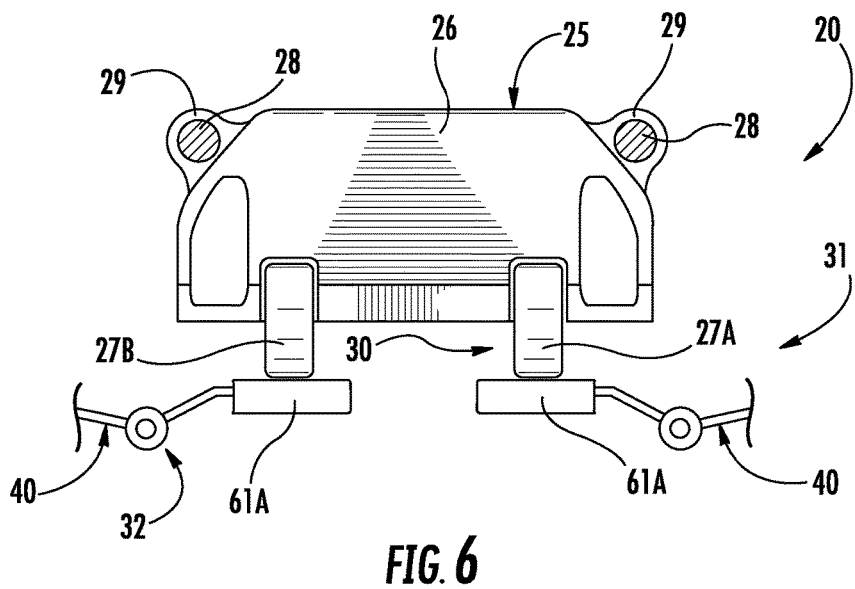
FIG. 6 is an enlarged, fragmentary, front elevation view corresponding to FIG. 1 showing the shuttle interacting with the power generator.

Rails 28 are fixed in place above and parallel to subsystems 31A and 31B and support shuttle 25 wheels down 27 centrally above and parallel to subsystems 31A and 31B, in which wheels 27A are registered with and ride along pedals 61A of power transfer assemblies 40 of subsystem 31A, and identically wheels 27B are registered with and ride along pedals 61B of power transfer assemblies 40 of subsystem 31B. As a matter of illustration and reference, FIG. 6 is an enlarged, fragmentary, front elevation view corresponding to FIG. 1 showing the positioning shuttle 25 in relation to power transfer assemblies 40, illustrating how wheel 27A is registered with and positioned on pedal 61A of one power transfer assembly 40 of subsystem 31A, and how wheel 27B is registered with and positioned on pedal 61A one power transfer assembly 40 of subsystem 31B. As a matter of further illustration and reference, FIG. 7 is an enlarged, fragmentary, isometric view corresponding to FIG. 1 illustrating how three of wheels 27A are registered with and ride along pedals 61A of power transfer assemblies 40 of subsystem 31A. The arrangement of wheels 27A in relation to pedals 61A of power transfer assemblies 40 of subsystem 31A is identical to the arrangement of wheels 27A in relation to pedals 61B of power transfer assemblies 40 of subsystem 31B. In the actuation of shuttle 25, wheels 27 are concurrently motor-driven rotatably in reciprocal clockwise and counterclockwise directions against pedals 61A of subsystems 31A and 31B, which produces the reciprocal movement of shuttle 25 over pedals 61A of subsystems 31A and 31B in the directions of double arrowed line A in FIG. 1.

Figure 8:
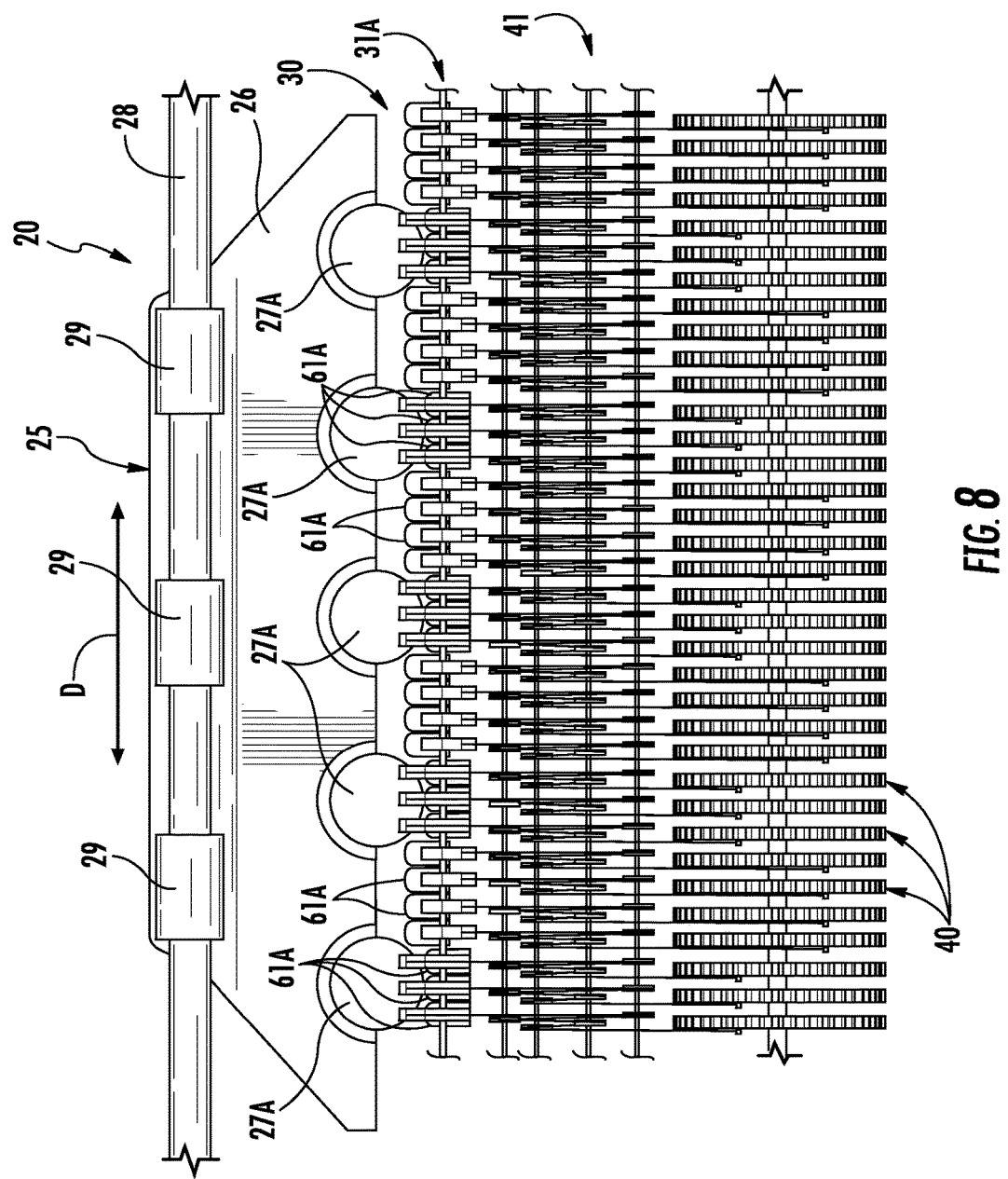
FIGS. 8 and 9 are side elevation views corresponding FIG. 1 showing a sequence of operation of the power generation apparatus.
Figure 9:
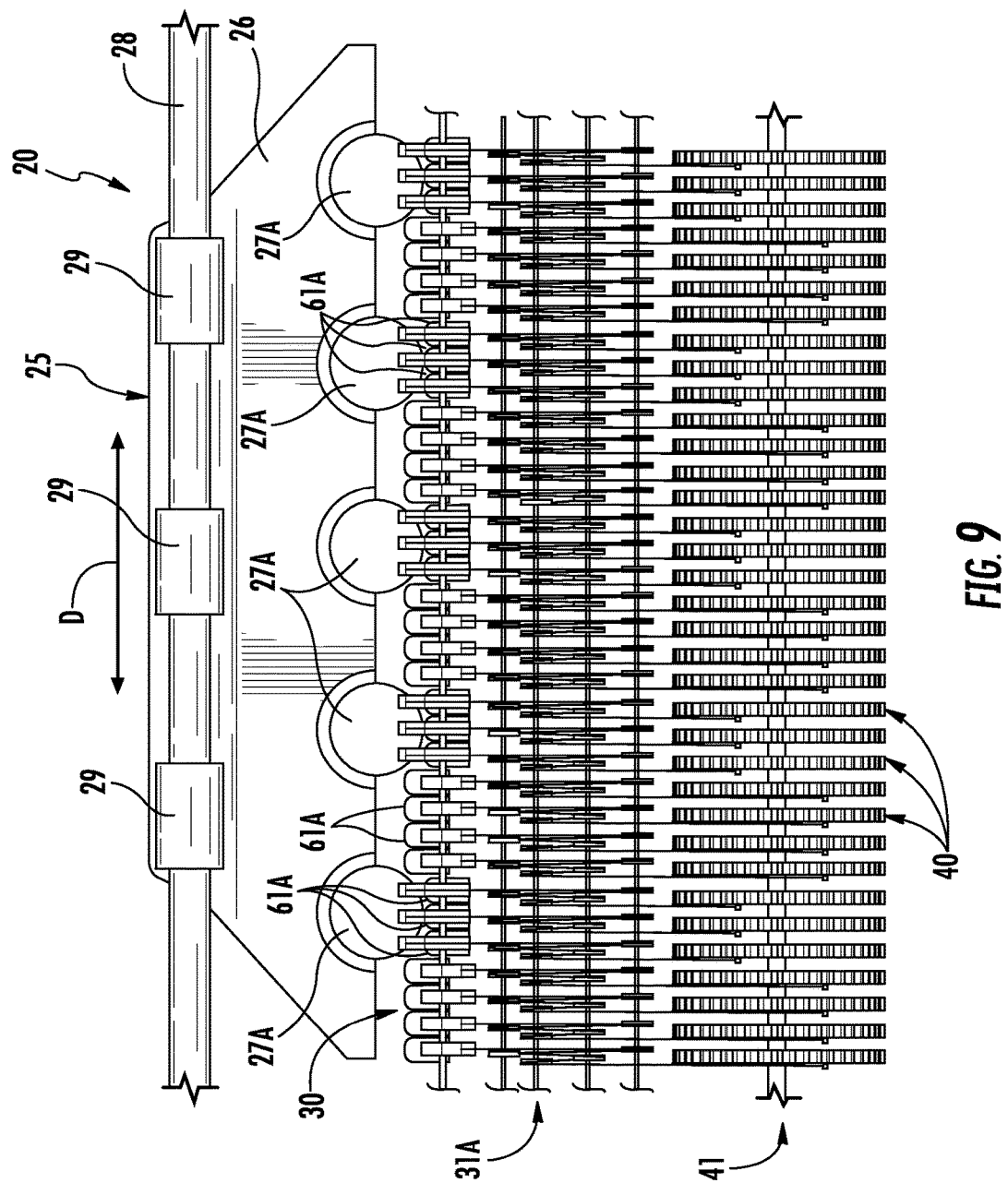

Power transfer assemblies 40 in first and second rows 41 and 42 are concurrently sequentially and repeatedly actuated by wheels 27 when shuttle 25 moves reciprocally in the directions indicated by double arrowed line A in FIG. 1, which urges concurrent rotation of output shafts 51 and 56 which, in turn, urges corresponding rotation of main output shaft 34 as discussed in detail above. FIGS. 8 and 9 are side elevation views corresponding FIG. 1 showing the sequence of operation of the power generation apparatus 30, illustrating shuttle 25 as it would appear reciprocated to one side in FIG. 8 and to the opposite side in FIG. 9. As shuttle 25 reciprocates in the directions of double arrowed line A in FIGS. 1, 8, and 9, each wheel 27A sequentially and repeatedly works seven pedals 61A of seven corresponding power transfer assemblies 40 of the thirty-five power transfer assemblies 40 of subsystem 31 up-and-down for sequentially and repeatedly moving each of such seven power transfer assemblies 40 between the at-rest position thereof and the actuated position thereof for urging corresponding rotation of output shaft 51. Identically, as shuttle 25 reciprocates in the directions of double arrowed line A, each wheel 27B sequentially and repeatedly works seven pedals 61B of seven corresponding power transfer assemblies 40 of the thirty-five power transfer assemblies 40 of subsystem 32 up-and-down for sequentially and repeatedly moving each of such seven power transfer assemblies 40 between the at-rest position thereof and the actuated position thereof for urging corresponding rotation of output shaft 56. And so as shuttle 25 reciprocates in the directions of double arrowed line A, wheels 27 sequentially and repeatedly work pedals 61A of the seventy power transfer assemblies 40 of subsystems 31 and 32 up-and-down for repeatedly moving each of the seventy power transfer assemblies 40 between the at-rest position thereof and the actuated position thereof for urging corresponding concurrent rotation of output shafts 51 and 56. In the operation of power generation apparatus 30, the concurrent rotation of output shafts 51 and 56, each in the same clockwise direction indicated by arrowed line E in relation to each one of output shafts 51 and 56 in FIGS. 1 and 2, urges corresponding rotation of main output shaft 34 in the same clockwise direction indicated by arrowed line J, in accordance with the principle of the invention. According to the principle of the invention, the rotation of main output shaft 34 can be put to use for any beneficial purposes, such as for driving equipment, generating electricity, or other selected beneficial purpose.

In sum, in the operation of power generation apparatus 20 wheels 27 repeatedly strike the corresponding pedals 61A of first ends 61 of rocker arms 60 of subsystems 31A and 31B causing them to move up-and-down when shuttle 25 moves in reciprocal directions indicated by double arrowed line A in FIG. 1, which repeatedly pivotally actuates the rocker arms 60 along their drive and reset strokes from their at-rest and actuated positions and from their actuated positions back to their at-rest positions. As disclosed herein, rocker arms 60 are each operatively coupled to output shaft 51, whereby the repeated actuation of rocker arms 60 between their at-rest and actuated positions urges corresponding rotation to output shafts 51 and 56 each in the direction of arrowed line E, a clockwise direction of rotation in this example. Output shafts 51 and 56 are, in turn, operative coupled to main output shaft 34, whereby rotation of output shafts 51 and 56 each in the direction of arrowed line E in the operation of power generation apparatus 20 urges corresponding rotation of main output shaft 34 in the same direction indicated by arrowed line J, a clockwise direction of rotation in this example. And so as wheels 27A repeatedly strike the corresponding pedals 61A of first ends 61 of rocker arms 60 of subsystem 31A and 31B causing them to move up-and-down when shuttle 25 moves in reciprocal directions indicated by double arrowed line A, pivotally actuating the rocker arms 60 along their drive and reset strokes from their at-rest and actuated positions and from their actuated positions back to their at-rest positions, power transfer assemblies 40 repeatedly actuate and work independently of one another and yet in concert with one another to urge concurrent rotation of output shafts 51 and 56 each in the direction of arrowed line E which, in turn, urges corresponding rotation of main output shaft 34 in the direction of arrowed line J.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A power transfer assembly, comprising:
   a rocker arm includes a first end and a second end and is mounted pivotally between the first end and the second end, wherein reciprocal movement of the first end between raised and lowered positions urges reciprocal movement of the second end between lowered and raised positions;
   a pulley apparatus couples the second end of the rocker arm to a drive member, wherein reciprocal movement of the second end of the rocker arm between its lowered and raised positions urges reciprocal rotation of the drive member between first and second positions; and
   the rocker arm is spring-loaded to enable the rocker arm to return to the raised position of the first end and the lowered position of the second end from the lowered position of the first end and the raised position of the second end.

2. The power transfer assembly according to claim 1, wherein the drive member is spring-loaded to enable the drive member to return to the first position from the second position when the second end of the rocker arm moves from its raised position to its lowered position.

3. The power transfer assembly according to claim 1, further comprising the drive member is operatively coupled to an output shaft, wherein reciprocal rotation of the drive member between its first and second positions urges rotation of the output shaft.

4. A power transfer assembly, comprising:
   a rocker arm includes a first end and a second end and is mounted pivotally between the first end and the second end, wherein reciprocal movement of the first end between raised and lowered positions urges reciprocal movement of the second end between lowered and raised positions; and
   a pulley apparatus couples the second end of the rocker arm to a drive member, wherein reciprocal movement of the second end of the rocker arm between its lowered and raised positions urges reciprocal rotation of the drive member between first and second positions, and the pulley apparatus comprises pulleys that support a drive element having an inner end connected to the second end of the rocker arm, and an outer end connected to the drive member.

5. The power transfer assembly according to claim 4, wherein the drive member is spring-loaded to enable the drive member to return to the first position from the second position when the second end of the rocker arm moves from its raised position to its lowered position.

6. The power transfer assembly according to claim 4, wherein the drive element is a cable.

7. The power transfer assembly according to claim 4, further comprising the drive member is operatively coupled to an output shaft, wherein reciprocal rotation of the drive member between its first and second positions urges rotation of the output shaft.

8. A power transfer assembly, comprising:
   a rocker arm includes a first end and a second end and is mounted pivotally at a pivot between the first end and the second end, wherein reciprocal movement of the first end between raised and lowered positions urges reciprocal movement of the second end between lowered and raised positions;
   a pulley apparatus couples the second end of the rocker arm to a drive member, wherein reciprocal movement of the second end of the rocker arm between its lowered and raised positions urges reciprocal rotation of the drive member between first and second positions; and
   the rocker arm is spring-loaded between the pivot and the second end of the rocker arm to enable the rocker arm to return to the raised position of the first end and the lowered position of the second end from the lowered position of the first end and the raised position of the second end.

9. The power transfer assembly according to claim 8, wherein the drive member is spring-loaded to enable the drive member to return to the first position from the second position when the second end of the rocker arm moves from its raised position to its lowered position.

10. The power transfer assembly according to claim 8, further comprising the drive member is operatively coupled to an output shaft, wherein reciprocal rotation of the drive member between its first and second positions urges rotation of the output shaft.

* * * * *